United States Patent
Ding et al.

(10) Patent No.: US 11,316,774 B2
(45) Date of Patent: Apr. 26, 2022

(54) PATH SELECTION METHOD AND APPARATUS

(71) Applicant: HUAWEI TECHNOLOGIES CO., LTD., Guangdong (CN)

(72) Inventors: Xiaojian Ding, Shenzhen (CN); Qin Wu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 173 days.

(21) Appl. No.: 16/691,048

(22) Filed: Nov. 21, 2019

(65) Prior Publication Data

US 2020/0092195 A1 Mar. 19, 2020

Related U.S. Application Data

(63) Continuation of application No. PCT/CN2017/120450, filed on Dec. 31, 2017.

(30) Foreign Application Priority Data

May 22, 2017 (CN) .......................... 201710364990.0

(51) Int. Cl.
*H04L 12/727* (2013.01)
*H04L 45/121* (2022.01)
(Continued)

(52) U.S. Cl.
CPC .......... *H04L 45/121* (2013.01); *H04L 45/123* (2013.01); *H04L 45/306* (2013.01); *H04L 47/283* (2013.01)

(58) Field of Classification Search
CPC ... H04L 45/121; H04L 45/123; H04L 45/306; H04L 47/283; H04L 45/30; H04L 45/302; H04L 45/22; H04L 45/64
See application file for complete search history.

(56) References Cited

U.S. PATENT DOCUMENTS 8,531,969 B2 9/2013 Ong
2002/0141345 A1* 10/2002 Szviatovszki ......... H04L 45/124
370/238
(Continued)

FOREIGN PATENT DOCUMENTS

CN 1731768 A 2/2006
CN 101001200 A 7/2007
(Continued)

OTHER PUBLICATIONS

D. King et al.,"Applicability of the Path Computation Element to Inter-Area and Inter-AS MPLS and GMPLS Traffic Engineering; draft-ietf-pce-inter-area-as-applicability-06.txt",Jul. 20, 2016 (Jul. 20, 2016),pp. 1-26,XP015114518.
(Continued)

*Primary Examiner* — Pao Sinkantarakorn
*Assistant Examiner* — Kabir U Jahangir
(74) *Attorney, Agent, or Firm* — Womble Bond Dickinson (US) LLP

(57) ABSTRACT

The present application describes a path selection method and apparatus. The method may include obtaining a required latency of a service. The method may further include determining a target path for the service from m strict explicit paths based on the required latency, where a latency of the target path is less than or equal to the required latency, all the m strict explicit paths are unallocated paths, any subpath of a first strict explicit path in the m strict explicit paths exists in only the first strict explicit path, the first strict explicit path is any path in the m strict explicit paths, and m is an integer greater than or equal to 1. The present invention is applicable to the field of communications technologies and resolves at least a problem where a path computation element (PCE) cannot ensure that a path allocated to a service can meet a latency requirement of the service.

18 Claims, 5 Drawing Sheets

(51) Int. Cl.
*H04L 45/12* (2022.01)
*H04L 45/30* (2022.01)
*H04L 47/283* (2022.01)

(56) References Cited

U.S. PATENT DOCUMENTS

| | | | |
|---|---|---|---|
| 2009/0300565 A1 | 12/2009 | Chiu et al. | |
| 2012/0026886 A1* | 2/2012 | Wang | H04L 45/125 370/238 |
| 2012/0069740 A1* | 3/2012 | Lu | H01L 45/04 370/238 |
| 2015/0200838 A1* | 7/2015 | Nadeau | H04B 10/27 398/58 |
| 2017/0064717 A1 | 3/2017 | Filsfils et al. | |

FOREIGN PATENT DOCUMENTS

| | | |
|---|---|---|
| CN | 101286941 A | 10/2008 |
| CN | 102752185 A | 10/2012 |
| CN | 102882787 A | 1/2013 |
| CN | 103095586 A | 5/2013 |
| CN | 104618235 A | 5/2015 |
| CN | 105517028 A | 4/2016 |

OTHER PUBLICATIONS

Maizumi H et al: "Packet Forwarding Along an Explicit Route Using the Unused Address Pool on a Packet Switching Network",Electronics and Communications in Japan,Sep. 1, 2007 (Sep. 1, 2007), pp. 78-89. XP001542559.

Nokia FutureWorks Technology Vision 2020 Reducing network latency to milliseconds,retrieved from : https://docplayer.net/18825275-Technology-vision-2020-reducing-network-latency-to-milliseconds.html on Aug. 12, 2020,total 20 pages.

* cited by examiner

| Type | NLRI Type |
|---|---|
| 1 | Node NLRI |
| 2 | Link NLRI |
| 3 | IPv4 Topology Prefix NLRI |
| 4 | IPv6 Topology Prefix NLRI |
| 5 | Network Slice Tunnel NLRI |

PATH SELECTION METHOD AND APPARATUS

CROSS-REFERENCE TO RELATED APPLICATION

This application is a continuation of International Application No. PCT/CN2017/120450, filed on Dec. 31, 2017, which claims priority to Chinese Patent Application No. 201710364990.0, filed on May 22, 2017. The disclosures of the aforementioned applications are hereby incorporated by reference in their entireties.

TECHNICAL FIELD

Embodiments of the present invention relate to the field of communications technologies, and in particular, to a path selection method and apparatus.

BACKGROUND

In an existing network, a path computation element (PCE) may compute a best path of a service based on a request of a path computation client (PCC). Specifically, if a path needs to be computed for a service, the PCC sends a path computation request to the PCE, and when the PCE receives the path computation request from the PCC, the PCE computes, by using existing network topology information, an end-to-end path that meets a constraint condition and a policy of the service. The PCE may obtain, through computation, a same path for different services. Because one path can be used for a plurality of services, and a latency of the path is affected by a quantity of services that use the path, the PCE cannot determine the latency of the path.

Most services have specific latency requirements. When the PCE cannot determine a latency of a path, the PCE cannot ensure that a path allocated to a service can meet a latency requirement of the service.

SUMMARY

Embodiments of the present invention provide a path selection method and apparatus, to resolve a problem that a PCE cannot ensure that a path allocated to a service can meet a latency requirement of the service.

The following technical solutions are used in the embodiments of the present invention to achieve the foregoing objective.

According to a first aspect, a path selection method is provided, where the method includes: obtaining a required latency of a service; and determining a target path for the service from m strict explicit paths based on the required latency, where a latency of the target path is less than or equal to the required latency, all the m strict explicit paths are unallocated paths, any subpath of a first strict explicit path in the m strict explicit paths exists in only the first strict explicit path, the first strict explicit path is any path in the m strict explicit paths, and m is an integer greater than or equal to 1.

According to the method provided in the first aspect, because any two paths do not include a same subpath and a path is allocated to only one service, a latency of each path is determined. When the path is determined for the service, the determined latency of the path is less than or equal to the required latency of the service, so that the path determined for the service can meet a latency requirement of the service, and an experience effect of a user is improved.

In a possible embodiment, before the determining a target path for the service from m strict explicit paths based on the required latency, the method further includes: determining a loose path corresponding to the service; and determining the m strict explicit paths based on unallocated network slices in network slices of n subpaths of the loose path, where a second strict explicit path in the m strict explicit paths includes n network slices, the n network slices are respectively corresponding to the n subpaths, a first network slice in the n network slices is an unallocated network slice in network slices of a subpath corresponding to the first network slice, the second strict explicit path is any path in the m strict explicit paths, the first network slice is any network slice in the n network slices, and n is an integer greater than or equal to 2.

In the possible embodiment, the m strict explicit paths can be determined for the service, and it can be ensured that any subpath of the first strict explicit path in the determined m strict explicit paths exists in only the first strict explicit path.

In a possible embodiment, after the determining the m strict explicit paths based on unallocated network slices in network slices of n subpaths of the loose path, the method further includes: determining a latency of each of the m strict explicit paths, where a latency of a third strict explicit path in the m strict explicit paths is a sum of latencies of all network slices that constitute the third strict explicit path, and the third strict explicit path is any path in the m strict explicit paths.

In the possible embodiment, the latencies of the m strict explicit paths can be determined for the service, so that the target path is subsequently determined for the service.

In a possible embodiment, the determining a target path for the service from m strict explicit paths based on the required latency includes: determining a priority of the service; determining available paths for the service from the m strict explicit paths based on the required latency, where a latency of each of the available paths is less than or equal to the required latency; and determining the target path from the available paths based on the priority.

In this possible embodiment, when the priority of the service is a high priority, a path with a relatively low latency in the available paths is determined as the target path; or when the priority of the service is a normal priority, a path with a relatively high latency in the available paths is determined as the target path, so as to improve user experience of a user with the high priority.

In a possible embodiment, after the determining a target path for the service from m strict explicit paths based on the required latency, the method further includes: determining an alternate path for the service, where a latency of the alternate path is less than or equal to the required latency.

In the possible embodiment, if a main path is faulty, a system can start the global protection mechanism, and smoothly switch the service to the alternate path that meets the service requirement for transmission, so as to enhance survivability of service transmission.

In a possible embodiment, the method further includes: releasing a network slice on the target path after a target time period, where the target time period is a time period for using the target path.

In the possible embodiment, after the user uses the target path, the network slice on the target path is released, so that the network slice is allocated to another user in time, and usage efficiency of the network slice is improved.

According to a second aspect, a path selection apparatus is provided, and the apparatus has a function of implementing any method provided in the first aspect. The function may be implemented by hardware, or may be implemented by hardware by executing corresponding software. The hardware or the software includes one or more units corresponding to the foregoing function.

According to a third aspect, a path selection apparatus is provided, including: a memory, a processor, and a communications bus, where the memory is configured to store a computer executable instruction, the processor and the memory are connected by using the communications bus, and the processor executes the computer executable instruction stored in the memory, so as to enable the apparatus to implement any method provided in the first aspect.

According to a fourth aspect, a computer readable storage medium is provided, including an instruction. When running on a computer, the instruction enables the computer to perform any method provided in the first aspect.

According to a fifth aspect, a computer program product that includes an instruction is provided. When running on a computer, the instruction enables the computer to perform any method provided in the first aspect.

For technical effects realized by any of the embodiment of the second aspect to the fifth aspect, refer to technical effects brought about by different design embodiments in the first aspect. Details are not described herein again.

DESCRIPTION OF EMBODIMENTS

Figure 1:
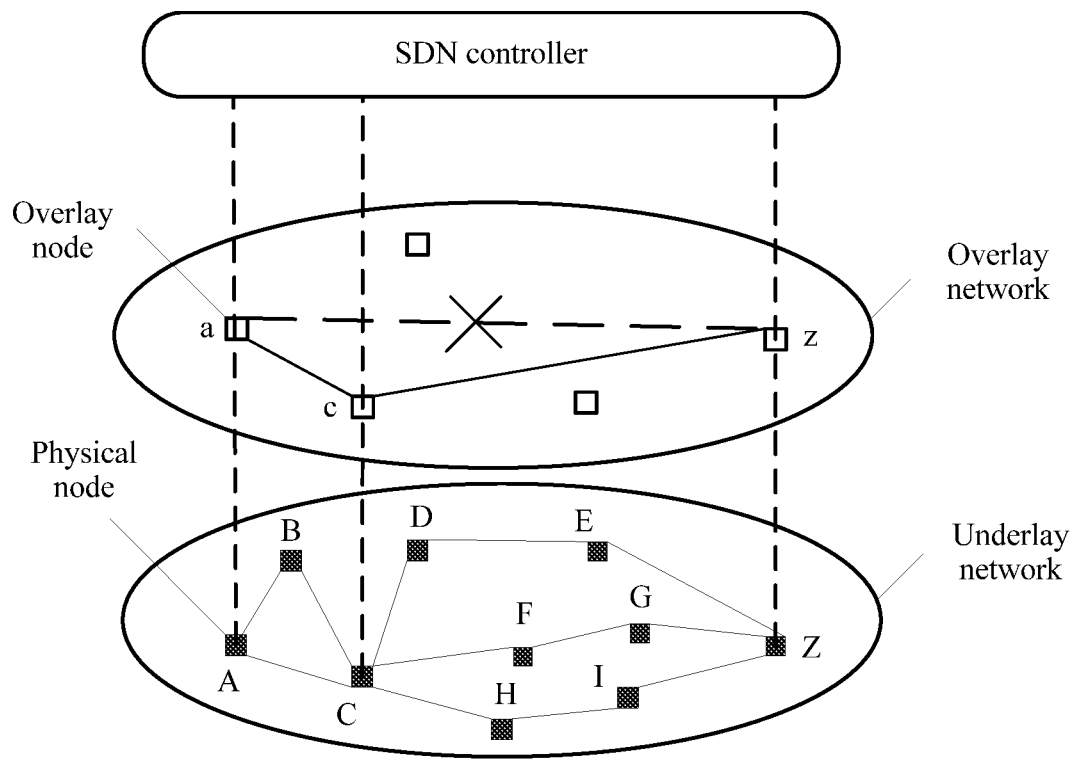
FIG. 1 is a schematic architectural diagram of an overlay network in the prior art.

The method provided in the embodiments of the present invention may be applied to an overlay network, a source packet routing in networking (SPRING), or the like. As shown in FIG. 1, the overlay network is a computer network established on another network (in FIG. 1, an example in which the overlay network is established on an underlay network is used for description). Nodes in the overlay network are connected to each other by using virtual links or logical links, and a path in the overlay network may be corresponding to a plurality of physical links in the underlay network. The overlay network may be connected to a software-defined networking (SDN) controller, and the SDN controller may be specifically an application-layer traffic optimization (ALTO) server. The overlay network includes a plurality of overlay nodes, and the overlay nodes (such as a, c, and z in the figure) may be terminal hosts. The underlay network includes a plurality of physical nodes (such as A, B, and C in the figure), and the physical nodes may be routers. One overlay node in the overlay network may be corresponding to at least one physical node in the underlay network. The SDN controller may control forwarding of a packet between the physical nodes. The SDN controller may exchange information with the plurality of overlay nodes, or may exchange information with the plurality of physical nodes.

Figure 2:
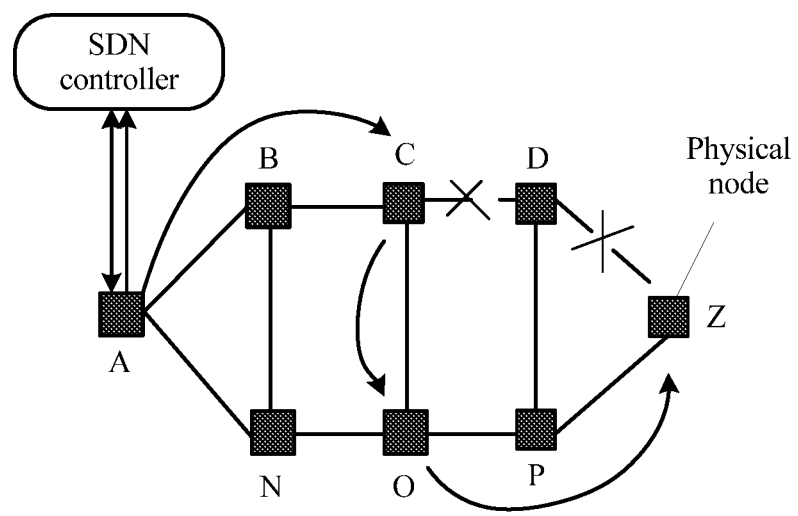
FIG. 2 is a schematic architectural diagram of a Spring network in the prior art.

As shown in FIG. 2, the Spring network includes an SDN controller and a plurality of physical nodes (such as A, B, and C in the figure). The SDN controller may be specifically a PCE server, and the physical nodes may be routers. The SDN controller may control forwarding of a packet between physical nodes, and the SDN controller exchanges information with only a source node (such as A in the figure).

Currently, services such as virtual reality (VR), augmented reality (AR), mixed reality (MR), automated driving, and Tactile Internet are all low-latency services. In a conventional Internet Protocol (IP) bearer network, various services share various resources in the network, packets of different priorities are stored in different queues, and scheduling is preferentially performed for a high-priority service, so that a low latency of the high-priority service in a case of heavy load can be ensured. However, because of a mechanism for sharing resources between services (for example, as mentioned in the background, a plurality of services share a path), it is difficult to meet transmission requirements of the foregoing services for deterministic low latencies. Based on this problem, an embodiment of the present invention provides a path selection method, so that a selected path can meet a requirement of a service for a deterministic low latency.

Figure 3:
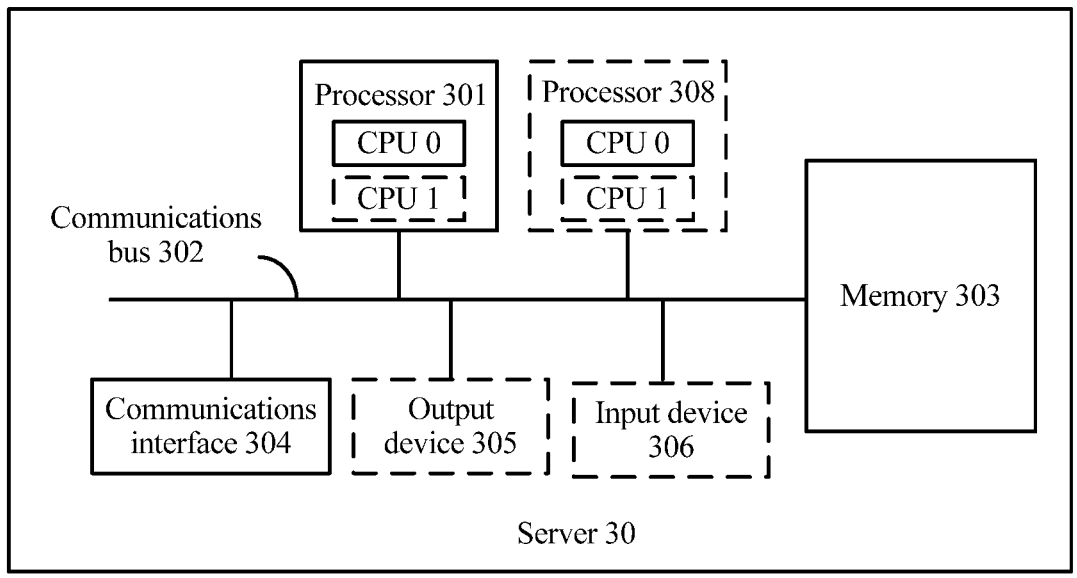
FIG. 3 is a structural diagram of hardware of a server according to an embodiment of the present invention.

FIG. 3 is a structural diagram of hardware of a server (or a controller) 30 according to an embodiment of this application. The server 30 includes at least one processor 301, a communications bus 302, a memory 303, and at least one communications interface 304.

The processor 301 may be a central processing unit (CPU), a microprocessor, an application-specific integrated circuit (ASIC), or one or more integrated circuits configured to control execution of a program in the solution in this application.

The communications bus 302 may include a channel for transmitting information between the foregoing components.

The communications interface 304 is configured to communicate, by using any apparatus like a transceiver, with another device or a communications network, such as the Ethernet, a radio access network (RAN), or a wireless local area network (WLAN).

The memory 303 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, optical disc storage (including a compact disc, a laser disc, an optical disc, a digital universal disc, a Blu-ray disc, or the like), a magnetic disk storage medium or another magnetic storage device, or any other medium that can be configured to carry or store expected program code in a form of instructions or data structures and capable of being accessed by a computer, but this is not limited thereto. The memory may exist independently and be connected to the processor by using the bus. Alternatively, the memory may be integrated with the processor.

The memory 303 is configured to store application program code that executes the solution in this application, and the processor 301 controls execution of the solution in this application. The processor 301 is configured to execute the application program code stored in the memory 303, so as to implement the method provided in the following embodiment of the present invention.

During specific implementation, in an embodiment, the processor 301 may include one or more CPUs, for example, a CPU 0 and a CPU 1 in FIG. 3.

During specific implementation, in an embodiment, the server 30 may include a plurality of processors, for example, the processor 301 and a processor 308 in FIG. 3. Each of the processors may be a single-core processor, or may be a multi-core (multi-CPU) processor. The processor herein may be one or more devices, circuits, and/or processing cores for processing data (for example, a computer program instruction).

During specific implementation, in an embodiment, the server 30 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive an input of a user in a plurality of manners. For example, the input device 306 may be a mouse, a keyboard, a touchscreen device, or a sensing device.

Figure 4:
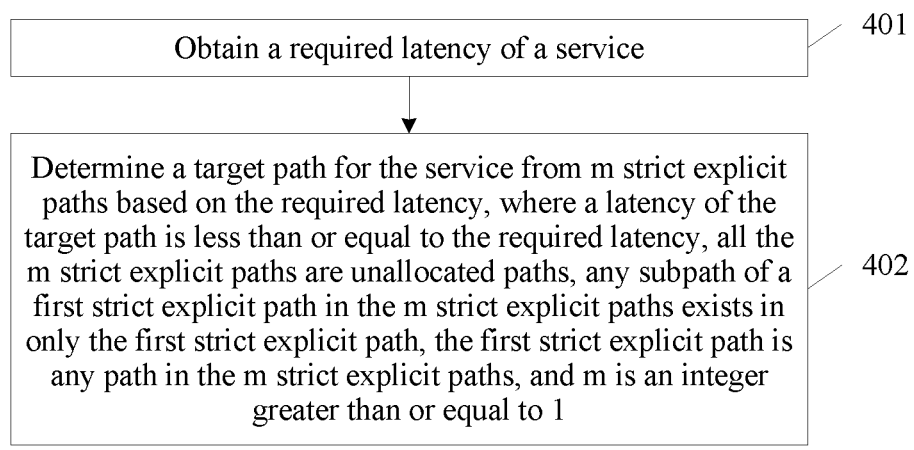
FIG. 4 is a flowchart of a path selection method according to an embodiment of the present invention.

An embodiment of the present invention provides a path selection method. As shown in FIG. 4, the method includes the following steps.

401. Obtain a required latency of a service.

An execution body of this embodiment of the present invention may be a path selection apparatus. The apparatus may be a controller or a server, the controller may be an SDN controller, and the SDN controller may be specifically an ALTO server, a PCE server, or the like. In the following, an example in which the execution body is the SDN controller is used to describe this embodiment of the present invention.

Specifically, an application program may send a service request to the controller or the server by using an application programming interface (API), where the service request may include information such as a service priority, a service flow identifier, a sending node and a receiving node of the service flow, the required latency of the service, and a time period for using a path.

For example, referring to FIG. 1 and FIG. 2, the sending node of the service flow may be A, and the receiving node may be Z.

402. Determine a target path for the service from m strict explicit paths based on the required latency, where a latency of the target path is less than or equal to the required latency, all the m strict explicit paths are unallocated paths, any subpath of a first strict explicit path in the m strict explicit paths exists in only the first strict explicit path, the first strict explicit path is any path in the m strict explicit paths, and m is an integer greater than or equal to 1.

The target path determined for the service is used to transmit the service flow of the service.

For a meaning of the strict explicit path, refer to RFC4927.

It should be noted that, in this embodiment of the present invention, only one strict explicit path is allocated to a service, any two strict explicit paths do not include a same subpath, and any two strict explicit paths may be two unallocated strict explicit paths, two allocated strict explicit paths, or one allocated strict explicit path and one unallocated strict explicit path.

A subpath of a path refers to a path between two adjacent nodes in the path. For example, if a strict explicit path is A-B-C-D-E-Z, subpaths of the strict explicit path are A-B, B-C, C-D, D-E, and E-Z respectively. For another example, referring to Table 1 below, if a loose path is A-C-Z, subpaths of the loose path are A-C and C-Z.

It should be noted that, a sending node and a receiving node of any one of the m strict explicit paths are respectively the same as the sending node and the receiving node of the service flow of the service.

Optionally, before step 402, the method may further include the following steps.

Determining a loose path corresponding to the service.

Specifically, the SDN controller may receive a path computation request, and determine, based on the path computation request, the loose path corresponding to the service.

For a meaning of the loose path, refer to RFC4927.

In this embodiment of the present invention, a node on the loose path corresponding to the service includes two transmission endpoints of the service flow of the service, and may further include one or more nodes between the two transmission endpoints. The one or more nodes may be specifically a node or nodes through which the service flow needs to pass when the service flow is transmitted between the two transmission endpoints.

For example, referring to FIG. 1, after the SDN controller receives a path computation request, because a link (that is, a path with a cross in the figure) between a-z in an overlay network is congested, a loose path of a service flow is determined as a-c-z. a is corresponding to A, c is corresponding to C, and z is corresponding to Z. Therefore, a loose path of a service flow in an underlay network is A-C-Z. A and Z are two transmission endpoints of the service flow, and Z is a node through which the service flow needs to pass when the service flow is transmitted between A and Z.

For example, referring to FIG. 2, after the SDN controller receives a path computation request, because a link (that is, a path with a cross in the figure) between C-D and D-Z in a Spring network is congested, a packet needs to be transmitted from a node C to a node O, and a loose path of a service flow in the Spring network is A-C-O-Z.

After determining a loose path corresponding to the service, the method may also include determining the m strict explicit paths based on unallocated network slices in network slices of n subpaths of the loose path, where a second strict explicit path in the m strict explicit paths includes n network slices, the n network slices are respectively corresponding to the n subpaths, a first network slice in the n network slices is an unallocated network slice in network slices of a subpath corresponding to the first network slice, the second strict explicit path is any path in the m strict explicit paths, the first network slice is any network slice in the n network slices, and n is an integer greater than or equal to 2.

For any one of the n subpaths, two endpoints of each network slice of the subpath are the same as two endpoints of the subpath, and each network slice of the subpath is a strict explicit path.

In this embodiment of the present invention, the SDN controller may store network slice information of each subpath of any loose path in the network, and the SDN controller may obtain a network slice of each subpath of the loose path based on the network slice information. Network slice information of a subpath may be obtained by performing network slice division on the subpath.

A principle for performing the network slice division on the subpath is as follows: Different network slices are not allowed to share a same physical link.

For example, referring to Table 1, if the loose path is A-C-Z, network slice information of the loose path A-C-Z may be specifically as follows:

TABLE 1

Network slice information of A-C-Z

| Subpath 1: A-C | | Subpath 2: C-Z | | |
|---|---|---|---|---|
| Slice 1: A-C (Allocated) | Slice 2: A-B-C (Reservable) | Slice 3: C-D-E-Z (Reservable) | Slice 4: C-F-G-Z (Reservable) | Slice 5: C-H-I-Z (Reservable) |

Specifically, the network slice information may further include allocation information of a slice. "Reservable" indicates that the slice has not been allocated, and "Allocated" indicates that the slice has been allocated.

The allocated network slice may be represented as a 6-tuple: <a slice number, a subpath number, a latency value, a service flow identifier, a used time, and a remaining time>. A reservable network slice can be represented as a 3-tuple: <a slice number, a subpath number, and a latency value>.

Referring to Table 1, the slice 1 has been allocated, and other slices are not allocated. Therefore, three strict explicit paths may be determined based on the slice 2, the slice 3, the slice 4, and the slice 5, which are specifically: A-B-C-D-E-Z, A-B-C-F-G-Z, and A-B-C-H-I-Z.

Figures 5, 6:
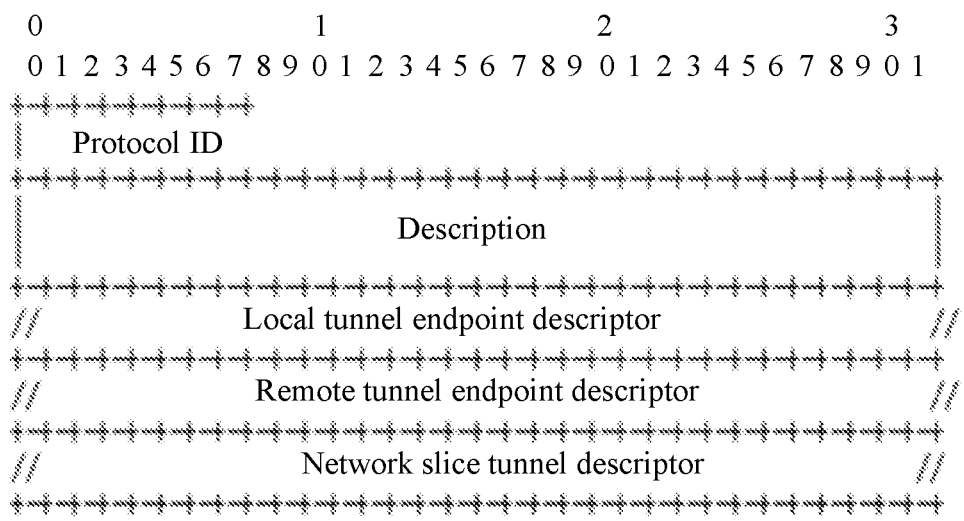
FIG. 5 is a schematic diagram of a network slice type according to an embodiment of the present invention.
FIG. 6 is a schematic diagram illustrating a new network slice type according to an embodiment of the present invention.

Specifically, in this embodiment of the present invention, the Border Gateway Protocol-Link State (BGP-LS) protocol may be used to define a new network slice type for the network slice obtained in this embodiment of the present invention. Referring to FIG. 5, a node NLRI, a link NLRI, Internet Protocol Version 4 (IPv4) topology prefix NLRI (IPv4 Topology Prefix NLRI), and Internet Protocol Version 6 (IPv6) topology prefix NLRI (IPv6 Topology Prefix NLRI) are four types of network layer reachability information (NLRI) in the BGP-LS, and network slice tunnel NLRI is a newly defined network slice type. Specifically, the network slice may be described by using the information shown in FIG. 6. A local tunnel endpoint descriptor and a remote tunnel endpoint descriptor are used to describe two endpoints of the network slice, a network slice tunnel descriptor is used to describe a path between a local endpoint to a remote endpoint, the description information may include a latency of the network slice. Further, the protocol ID information may be included in FIG. 6.

Specifically, a physical node may report the information about each network slice to the SDN controller by using the BGP-LS protocol, where the network slice information may include the information shown in FIG. 6. A BGP-LS Attribute of the BGP-LS protocol may be extended: A new Link Attribute Type/Length/Value (TLV) may be defined in the BGP-LS Attribute, and the latency of the network slice is carried in the new Link Attribute TLV and reported to the SDN controller. Specifically, a latency range that can be ensured by the network slice may be indicated by using a (min delay, max delay), and the latency of the network slice does not need to be periodically reported unless network topology changes.

In the overlay network, all physical nodes that can exchange information with the SDN controller may report the network slice information. In the Spring network, only a source node may report the network slice information.

Optionally, after determining the m strict explicit paths as discussed above e, the method may further include: determining a latency of each of the m strict explicit paths, where a latency of a third strict explicit path in the m strict explicit paths is a sum of latencies of all network slices that constitute the third strict explicit path, and the third strict explicit path is any path in the m strict explicit paths.

Any two paths in the first strict explicit path, the second strict explicit path, and the third strict explicit path may be a same path, or may be different paths.

A latency of a network slice includes a node latency, a link propagation latency, and a packet transmission latency of each node of the network slice.

Specifically, the node latency is a difference between an ingress physical layer (PHY) device in the node and an egress device in the node; the link propagation latency is a ratio of a channel length to a transmission rate of an electromagnetic wave on the channel; and the packet transmission latency is a ratio of a data frame length to a sending rate.

Figure 7:
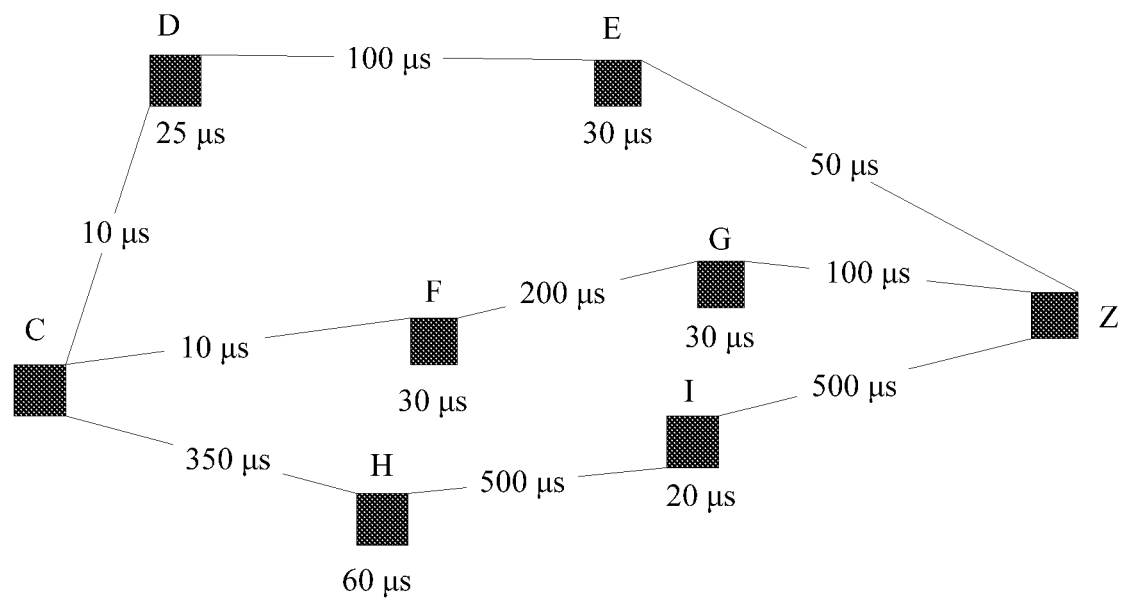
FIG. 7 is a schematic diagram of a latency of a network slice according to an embodiment of the present invention.

Based on the example in Table 1, for the subpath 2, refer to FIG. 7. If each latency value is shown in Table 2, a latency of the slice 3 is 215 µs, a latency of the slice 4 is 370 µs, and a latency of the slice 5 is 1430 µs.

TABLE 2

| Slice Number | Node latency | | Link propagation latency + Packet transmission latency | | |
|---|---|---|---|---|---|
| 3 | Node D | Node E | C-D | D-E | E-Z |
|   | 25 µs | 30 µs | 10 µs | 100 µs | 50 µs |
| 4 | Node F | Node G | C-F | F-G | G-Z |
|   | 30 µs | 30 µs | 10 µs | 200 µs | 100 µs |
| 5 | Node H | Node I | C-H | H-I | I-Z |
|   | 60 µs | 20 µs | 350 µs | 500 µs | 500 µs |

Optionally and in some embodiments, step 402 may specifically include: determining a priority of the service; determining available paths for the service from m strict explicit paths based on the required latency, where a latency of each of the available paths is less than or equal to the required latency; and determining the target path from the available paths based on the priority.

Specifically, an available path is a path that is in the m strict explicit paths and whose latency is less than or equal to the required latency. When the priority of the service is a high priority, a path with a relatively low latency in the available paths is determined as the target path, and specifically, a path that has a lowest latency in the available paths is determined as the target path; or when the priority of the service is a common priority, a path with a relatively high latency in the available paths is determined as the target path, so as to improve user experience of a user with the high priority.

When paths are allocated to a plurality of services with a same loose path, a path with a relatively low latency in strict explicit paths of the loose path may be allocated to a service with a relatively high priority, and a path with a relatively high latency may be allocated to a service with a relatively low priority.

Optionally, for reliability of transmission, after step 402, the method may further include: determining an alternate path for the service, where a latency of the alternate path is less than or equal to the required latency.

Figure 8:
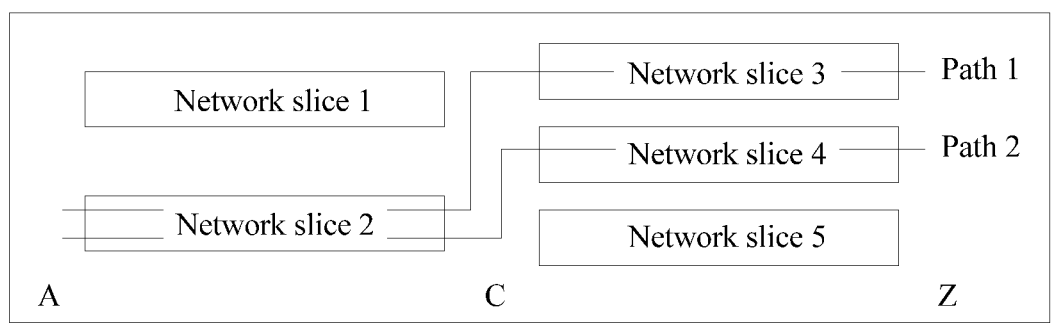
FIG. 8 is a schematic diagram of constituting a path by network slices according to an embodiment of the present invention.

Based on the example shown in Table 1, only the network slice 2 is available for the subpath 1, and the network slice 3, the network slice 4, and the network slice 5 are available for the subpath 2. Referring to FIG. 8, a latency of a path 1 that includes a network slice 2 and a network slice 3 and a latency of a path 2 that includes the network slice 2 and a network slice 4 are less than the required latency of the service. Therefore, the path 1 may be determined as a main path of the service, and the path 2 may be determined as an alternate path of the service. If the main path is faulty, a system may start a global protection mechanism, and smoothly switch the service to the alternate path for transmission, where the alternate path meets a service requirement, so as to improve survivability of service transmission.

Optionally, the method may further include: releasing a network slice on the target path after a target time period, where the target time period is a time period for using the target path.

Specifically, after the user uses the target path, the network slice on the target path is released, so that the network slice is allocated to another user in time, and usage efficiency of the network slice is improved.

According to the method provided in this embodiment of the present invention, because any two paths do not include a same subpath and a path is allocated to only one service, a latency of each path is determined. When the path is determined for the service, the determined latency of the path is less than or equal to the required latency of the service, so that the path determined for the service can meet a latency requirement of the service, and an experience effect of the user is improved.

The foregoing has mainly described the solutions provided in the embodiments of this application from a perspective of the method. It may be understood that, to implement the foregoing functions, the path selection apparatus includes corresponding hardware structures and/or software modules for performing the functions. A person of ordinary skill in the art should be easily aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, function modules of the path selection apparatus may be obtained through division based on the foregoing method examples. For example, each function module may be obtained through division based on each function, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

Figure 9:
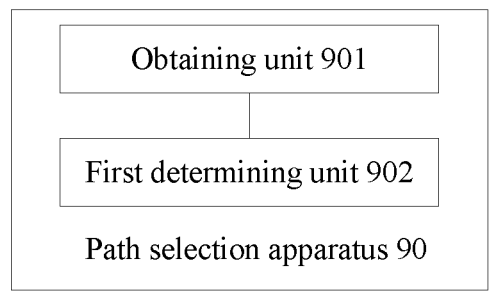
FIG. 9 is a schematic diagram of composition of a path selection apparatus according to an embodiment of the present invention.

For example, when function modules are divided based on corresponding functions, FIG. 9 shows a possible structure of a path selection apparatus 90 used in the foregoing embodiment. Referring to FIG. 9, the path selection apparatus 90 may include:

an obtaining unit 901, configured to obtain a required latency of a service; and a first determining unit 902, configured to determine a target path for the service from m strict explicit paths based on the required latency, where a latency of the target path is less than or equal to the required latency, all the m strict explicit paths are unallocated paths, any subpath of a first strict explicit path in the m strict explicit paths exists in only the first strict explicit path, the first strict explicit path is any path in the m strict explicit paths, and m is an integer greater than or equal to 1.

Figure 10:
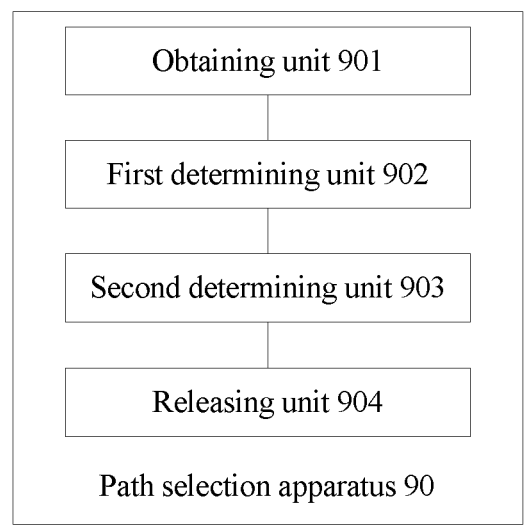
FIG. 10 is a schematic diagram of composition of another path selection apparatus according to an embodiment of the present invention.

Optionally, referring to FIG. 10, the apparatus 90 may further include:

a second determining unit 903, configured to determine a loose path corresponding to the service; where the second determining unit 903 is further configured to determine the m strict explicit paths based on unallocated network slices in network slices of n subpaths of the loose path, where a second strict explicit path in the m strict explicit paths includes n network slices, the n network slices are respectively corresponding to the n subpaths, a first network slice in the n network slices is an unallocated network slice in network slices of a subpath corresponding to the first network slice, the second strict explicit path is any path in the m strict explicit paths, the first network slice is any network slice in the n network slices, and n is an integer greater than or equal to 2.

Optionally, the second determining unit 903 is further configured to determine a latency of each of the m strict explicit paths, where a latency of a third strict explicit path in the m strict explicit paths is a sum of latencies of all network slices that constitute the third strict explicit path, and the third strict explicit path is any path in the m strict explicit paths.

Optionally, the first determining unit 902 is specifically configured to:

determine a priority of the service;

determine available paths for the service from the m strict explicit paths based on the required latency, where a latency of each of the available paths is less than or equal to the required latency; and determine the target path from the available paths based on the priority.

Optionally, the first determining unit 902 is further configured to:

determine an alternate path for the service, where a latency of the alternate path is less than or equal to the required latency.

Optionally, referring to FIG. 10, the apparatus 90 further includes:

a releasing unit 904, configured to release a network slice on the target path after a target time period, where the target time period is a time period for using the target path.

Each unit in the apparatus 90 is configured to perform the foregoing method. Therefore, for a beneficial effect of the apparatus 90, refer to a beneficial effect of the foregoing method, and details are not described herein again.

An embodiment of the present invention further provides a path selection apparatus. The apparatus includes: a memory, a processor, and a communications bus, where the memory is configured to store a computer executable instruction; the processor and the memory are connected by using the communications bus; and the processor executes the computer executable instruction stored in the memory, so as to enable the apparatus to implement the foregoing methods. Specifically, for a schematic structural diagram of the apparatus, refer to FIG. 3. The obtaining unit 901, the first determining unit 902, the second determining unit 903, and the releasing unit 904 may be collectively a processor 301.

An embodiment of the present invention further provides a computer readable storage medium, including an instruction. When running on a computer, the instruction enables the computer to perform the foregoing methods.

An embodiment of the present invention further provides a computer program product that includes an instruction. When running on a computer, the instruction enables the computer to perform the foregoing methods.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disk (DVD)), a semiconductor medium (for example, a solid-state drive ( )), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A path selection method, comprising:
    obtaining, by a path selection apparatus, a required latency of a service;
    determining a loose path corresponding to the service;
    determining m strict explicit paths based on unallocated network slices in network slices of n subpaths of the loose path, n is an integer greater than or equal to 2 and m is an integer greater than or equal to 1;
    determining, by the path selection apparatus, a target path for the service from the m strict explicit paths based on the required latency, wherein a latency of the target path is less than or equal to the required latency, all the m strict explicit paths are unallocated paths, any subpath of a first strict explicit path in the m strict explicit paths exists in only the first strict explicit path, and the first strict explicit path is any path in the m strict explicit paths; and
    causing, by the path selection apparatus, transmission of a service flow of the service using the determined target path.

2. The method according to claim 1, wherein a second strict explicit path in the m strict explicit paths comprises n network slices, the n network slices are respectively corresponding to the n subpaths, a first network slice in the n network slices is an unallocated network slice in network slices of a subpath corresponding to the first network slice, the second strict explicit path is any path in the m strict explicit paths, and the first network slice is any network slice in the n network slices.

3. The method according to claim 2, wherein after the determining the m strict explicit paths based on unallocated network slices in network slices of n subpaths of the loose path, the method further comprises:
    determining a latency of each of the m strict explicit paths, wherein a latency of a third strict explicit path in them strict explicit paths is a sum of latencies of all network slices that constitute the third strict explicit path, and the third strict explicit path is any path in the m strict explicit paths.

4. The method according to claim 1, wherein the determining the target path for the service from m strict explicit paths based on the required latency comprises:
    determining a priority of the service;
    determining available paths for the service from the m strict explicit paths based on the required latency, wherein a latency of each of the available paths is less than or equal to the required latency; and
    determining the target path from the available paths based on the priority.

5. The method according to claim 1, wherein after the determining the target path for the service from m strict explicit paths based on the required latency, the method further comprises:
    determining an alternate path for the service, wherein a latency of the alternate path is less than or equal to the required latency.

6. The method according to claim 1, wherein the method further comprises:
    releasing a network slice on the target path after a target time period, wherein the target time period is a time period for using the target path.

7. A path selection apparatus, comprising:
a memory configured to store a computer executable instruction; and
a processor coupled with the memory using a communications bus, the processor configured to execute the computer executable instruction to cause the apparatus to:
obtain a required latency of a service,
determine a loose path corresponding to the service,
determine m strict explicit paths based on unallocated network slices in network slices of n subpaths of the loose path, n is an integer greater than or equal to 2 and m is an integer greater than or equal to 1,
determine a target path for the service from the m strict explicit paths based on the required latency, wherein a latency of the target path is less than or equal to the required latency, all the m strict explicit paths are unallocated paths, any subpath of a first strict explicit path in the m strict explicit paths exists in only the first strict explicit path, and the first strict explicit path is any path in the m strict explicit paths, and
cause transmission of a service flow of the service using the determined target path.

8. The apparatus according to claim 7, wherein a second strict explicit path in the m strict explicit paths comprises n network slices, the n network slices are respectively corresponding to the n subpaths, a first network slice in the n network slices is an unallocated network slice in network slices of a subpath corresponding to the first network slice, the second strict explicit path is any path in the m strict explicit paths, and the first network slice is any network slice in the n network slices.

9. The apparatus according to claim 8, wherein the processor executes the computer executable instruction to further cause the apparatus to:
determine a latency of each of the m strict explicit paths, wherein a latency of a third strict explicit path in them strict explicit paths is a sum of latencies of all network slices that constitute the third strict explicit path, and the third strict explicit path is any path in the m strict explicit paths.

10. The apparatus according to claim 7, wherein the processor executing the computer executable instruction to cause the apparatus to determine the target path for the service comprises the processor executing the computer executable instruction to cause the apparatus to:
determine a priority of the service;
determine available paths for the service from the m strict explicit paths based on the required latency, wherein a latency of each of the available paths is less than or equal to the required latency; and
determine the target path from the available paths based on the priority.

11. The apparatus according to claim 7, wherein the processor executes the computer executable instruction to further cause the apparatus to:
determine an alternate path for the service, wherein a latency of the alternate path is less than or equal to the required latency.

12. The apparatus according to claim 7, wherein the processor executes the computer executable instruction to further cause the apparatus to:
release a network slice on the target path after a target time period, wherein the target time period is a time period for using the target path.

13. A non-transitory computer readable storage medium storing an instruction, which when executed by a computer system, cause the computer system to perform operations for path selection, the operations comprising:
obtaining a required latency of a service;
determining a loose path corresponding to the service;
determining m strict explicit paths based on unallocated network slices in network slices of n subpaths of the loose path, n is an integer greater than or equal to 2 and m is an integer greater than or equal to 1;
determining a target path for the service from the m strict explicit paths based on the required latency, wherein a latency of the target path is less than or equal to the required latency, all the m strict explicit paths are unallocated paths, any subpath of a first strict explicit path in the m strict explicit paths exists in only the first strict explicit path, and the first strict explicit path is any path in the m strict explicit paths; and
causing transmission of a service flow of the service using the determined target path.

14. The non-transitory computer readable storage medium according to claim 13, wherein a second strict explicit path in the m strict explicit paths comprises n network slices, the n network slices are respectively corresponding to the n subpaths, a first network slice in the n network slices is an unallocated network slice in network slices of a subpath corresponding to the first network slice, the second strict explicit path is any path in the m strict explicit paths, and the first network slice is any network slice in the n network slices.

15. The non-transitory computer readable storage medium according to claim 14, wherein after the determining the m strict explicit paths based on unallocated network slices in network slices of n subpaths of the loose path, the method further comprises:
determining a latency of each of the m strict explicit paths, wherein a latency of a third strict explicit path in them strict explicit paths is a sum of latencies of all network slices that constitute the third strict explicit path, and the third strict explicit path is any path in the m strict explicit paths.

16. The non-transitory computer readable storage medium according to claim 13, wherein the determining the target path for the service from m strict explicit paths based on the required latency comprises:
determining a priority of the service;
determining available paths for the service from the m strict explicit paths based on the required latency, wherein a latency of each of the available paths is less than or equal to the required latency; and
determining the target path from the available paths based on the priority.

17. The non-transitory computer readable storage medium according to claim 13, wherein after the determining the target path for the service from m strict explicit paths based on the required latency, the method further comprises:
determining an alternate path for the service, wherein a latency of the alternate path is less than or equal to the required latency.

18. The non-transitory computer readable storage medium according to claim 13, wherein the method further comprises:
releasing a network slice on the target path after a target time period, wherein the target time period is a time period for using the target path.

* * * * *